(12) United States Patent
Fox et al.

(10) Patent No.: US 7,691,168 B2
(45) Date of Patent: Apr. 6, 2010

(54) HIGHLY CHARGED, CHARGE STABLE NANOFIBER WEB

(75) Inventors: Andrew R. Fox, Oakdale, MN (US); Marvin E. Jones, Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 287 days.

(21) Appl. No.: 11/539,885

(22) Filed: Oct. 10, 2006

(65) Prior Publication Data

US 2010/0043639 A1    Feb. 25, 2010

Related U.S. Application Data

(60) Provisional application No. 60/728,230, filed on Oct. 19, 2005.

(51) Int. Cl.
*B01D 24/00* (2006.01)
*D01D 5/20* (2006.01)
*H05H 1/26* (2006.01)
*A62B 7/10* (2006.01)
*B03C 3/00* (2006.01)

(52) U.S. Cl. .................. 55/528; 264/167; 264/423; 128/206.16; 96/15; 96/67

(58) Field of Classification Search .............. 264/167, 264/423, 197; 55/528; 128/206.16, 208, 128/16, 208.16; 96/15, 67
See application file for complete search history.

(56) References Cited

U.S. PATENT DOCUMENTS

| | | | |
|---|---|---|---|
| 2,988,168 A * | 6/1961 | Wittemeier et al. ........... 55/488 |
| 4,011,067 A | 3/1977 | Carey, Jr. |
| 4,215,682 A | 8/1980 | Kubik et al. |
| 4,296,163 A * | 10/1981 | Emi et al. .................. 428/212 |
| 4,360,364 A * | 11/1982 | Kohl ........................... 95/275 |
| 4,363,646 A | 12/1982 | Torobin |
| 4,536,361 A | 8/1985 | Torobin |
| 4,536,440 A | 8/1985 | Berg |
| 4,547,420 A | 10/1985 | Krueger et al. |
| 4,592,815 A | 6/1986 | Nakao |
| 4,729,371 A | 3/1988 | Krueger et al. |
| 4,798,850 A | 1/1989 | Brown |
| 4,850,347 A * | 7/1989 | Skov ..................... 128/206.16 |
| 5,230,455 A * | 7/1993 | Price ............................ 226/88 |
| 5,374,458 A | 12/1994 | Burgio |
| 5,401,446 A | 3/1995 | Tsai et al. |

(Continued)

FOREIGN PATENT DOCUMENTS

EP    1483034 A1    12/2004

(Continued)

OTHER PUBLICATIONS

Tsai et al., *Electrospinning Theory and Techniques*, 14th Annual International TANDEC Nonwovens Conference, Nov. 9-11, 2004.

*Primary Examiner*—Walter D Griffin
*Assistant Examiner*—Amber Orlando
(74) *Attorney, Agent, or Firm*—Karl G. Hanson

(57) ABSTRACT

A charged multilayer filter includes a hydrocharged filtration layer containing a plurality of intertwined nanofibers that have a finite length of about 12 to about 300 mm, atop a porous roll-to-roll processable support layer.

25 Claims, 7 Drawing Sheets

U.S. PATENT DOCUMENTS

| | | | |
|---|---|---|---|
| 5,496,507 A | | 3/1996 | Angadjivand et al. |
| 5,620,545 A | * | 4/1997 | Braun et al. ................ 156/205 |
| 5,620,785 A | * | 4/1997 | Watt et al. .................... 428/219 |
| 5,639,700 A | * | 6/1997 | Braun et al. ................ 442/340 |
| 5,672,399 A | * | 9/1997 | Kahlbaugh et al. .......... 428/36.1 |
| 5,908,598 A | | 6/1999 | Rousseau et al. |
| 5,993,943 A | | 11/1999 | Bodaghi et al. |
| 6,036,752 A | * | 3/2000 | Reuter ............................ 96/67 |
| 6,117,515 A | * | 9/2000 | Brunson et al. ............... 428/83 |
| 6,119,691 A | | 9/2000 | Angadjivand et al. |
| 6,183,536 B1 | * | 2/2001 | Schultink et al. ............... 95/57 |
| 6,183,670 B1 | | 2/2001 | Torobin et al. |
| 6,315,806 B1 | | 11/2001 | Torobin et al. |
| 6,372,004 B1 | * | 4/2002 | Schultink et al. .............. 55/382 |
| 6,375,886 B1 | | 4/2002 | Angadjivand et al. |
| 6,394,090 B1 | | 5/2002 | Chen et al. |
| 6,397,458 B1 | | 6/2002 | Jones et al. |
| 6,398,847 B1 | | 6/2002 | Jones et al. |
| 6,406,657 B1 | | 6/2002 | Eitzman et al. |
| 6,409,806 B1 | | 6/2002 | Jones et al. |
| 6,454,986 B1 | | 9/2002 | Eitzman et al. |
| 6,554,881 B1 | | 4/2003 | Healey |
| 6,562,112 B2 | | 5/2003 | Jones et al. |
| 6,607,624 B2 | | 8/2003 | Berrigan et al. |
| 6,627,563 B1 | | 9/2003 | Huberty |
| 6,673,136 B2 | | 1/2004 | Gillingham et al. |
| 6,716,274 B2 | | 4/2004 | Gogins et al. |
| 6,740,137 B2 | | 5/2004 | Kubokawa et al. |
| 6,743,273 B2 | | 6/2004 | Chung et al. |
| 6,743,464 B1 | | 6/2004 | Insley et al. |
| 6,827,764 B2 | | 12/2004 | Springett et al. |
| 6,916,752 B2 | | 7/2005 | Berrigan et al. |
| 7,069,930 B2 | | 7/2006 | Bostock et al. |
| 2002/0121194 A1 | * | 9/2002 | Buchwald et al. .............. 96/66 |
| 2003/0141261 A1 | | 7/2003 | Koslow |
| 2003/0196964 A1 | | 10/2003 | Koslow |
| 2005/0217226 A1 | | 10/2005 | Sundet et al. |

FOREIGN PATENT DOCUMENTS

| JP | 9-76387 | 3/1997 |
|---|---|---|

* cited by examiner

○ corona-charged
■ corona + hydrocharged
◆ plasma fluorinated + hydrocharged
△ uncharged

HIGHLY CHARGED, CHARGE STABLE NANOFIBER WEB

CROSS-REFERENCE TO RELATED APPLICATION

This application claims priority to U.S. Provisional Application No. 60/728,230 filed Oct. 19, 2005, the entire disclosure of which is incorporated herein by reference.

FIELD

This invention relates to fibrous air filtration webs.

BACKGROUND

When exposed to an air stream containing submicron particles, air filtration webs typically experience a loss of filtration efficiency. Filtration efficiency may be evaluated using a percent penetration test that uses a challenge aerosol that contains, for example, particles of sodium chloride or dioctyl phthalate. Both initial penetration and maximum penetration may be determined in accordance with such a test. Maximum penetration values are of particular interest because they present an indication of filter service life.

A variety of charging techniques have been employed to improve filtration efficiency. Certain substances such as oily aerosols, however, are known to cause a decline in electric charge over time. High initial filtration efficiencies may be achieved using charged filter media such as needled felt, or charged spunbond or meltblown webs. An undesirably high basis weight, however, may also be required, especially for charged media with larger diameter fibers. Coarse fiber charged filter media often has high initial efficiency but may experience a severe drop in efficiency as the filter accumulates very fine particles. This efficiency loss in charged filter media may be referred to as electret degradation. American Society of Heating, Refrigerating and Air-Conditioning Engineers, Inc. (ASHRAE) Standard No. 52.2 entitled "Method of Testing General Ventilation Air Cleaning Devices for Removal Efficiency by Particle Size" defines a minimum efficiency reported value (MERV) rating for heating, ventilating and air conditioning (HVAC) filters. Proposed changes in Standard No. 52.2 to account for electret degradation may change the standard so that electret filters are challenged with a greater proportion of small particles. If enacted, these changes to the standard may reduce MERV ratings for typical electret filter media by 2-3 rating points.

In general, fine fibers (e.g., nanofibers) also promote high filtration efficiency, but pressure drop typically increases as fiber diameter decreases. For example, high initial filtration efficiencies may be achieved using fiberglass composites containing submicron fibers, but these good initial filtration efficiencies are often achieved at the expense of a higher initial pressure drop. Glass fibers also are problematic in that the fibers are generally not recyclable and are prone to fracture due to their brittleness. Glass fiber fragments may also cause respiratory or epidermal irritation. Filter media made from polymeric nanofibers have been used instead of glass fibers. Polymeric nanofibers, however, have poorer chemical and solvent resistance than glass fibers. For example, polymeric nanofibers produced using electrospinning are at a minimum susceptible to the solvents from which they were spun. Also, many currently available nanofibers are typically produced at such low rates as to be excessive in cost for many applications. Electrospun nanofibers are typically produced at grams per day rates, and blown glass nanofibers are relatively expensive when compared to standard filter media. Even islands-in-the-sea nanofibers, which can be produced at high rates, are costly to produce because they require a removable sea and a process step to remove the sea.

Initial penetration and maximum penetration values may sometimes be poorly correlated. This lack of correlation makes it difficult to predict maximum penetration values based on initial penetration measurements. Maximum penetration may instead be measured, but this measurement may take a long time for media exposed to very small (e.g., submicron) particles. Filter design also may be made more difficult when a web exhibits poorly correlated initial and maximum penetration values.

Fibrous air filtration webs are described, for example, in U.S. Pat. Nos. 4,011,067 (Carey), 4,215,682 (Kubik et al.), 4,592,815 (Nakao), 4,729,371 (Krueger et al.), 4,798,850 (Brown), 5,401,466 (Tsai et al.), 5,496,507 (Angadjivand et al. '507), 6,119,691 (Angadjivand et al. '691), 6,183,670 B1 (Torobin et al. '670), 6,315,806 B1 (Torobin et al. '806), 6,397,458 B1 (Jones et al. '458), 6,554,881 B1 (Healey), 6,562,112 B2 (Jones et al. '112), 6,627,563 B1 (Huberty), 6,673,136 B2 (Gillingham et al.), 6,716,274 B2 (Gogins et al.), 6,743,273 B2 (Chung et al.) and 6,827,764 B2 (Springett et al.), and in Tsai et al., *Electrospinning Theory and Techniques*, 14th Annual International TANDEC Nonwovens Conference, Nov. 9-11, 2004. Other fibrous webs are described, for example, in U.S. Pat. Nos. 4,536,361 (Torobin) and 5,993,943 (Bodaghi et al.).

SUMMARY OF THE INVENTION

The present invention provides charged air filtration media that has surprisingly effective filtration performance even after exposure to an air stream that contains small particles. The disclosed media has very good charge retention and much better correlation of initial and maximum penetration values than is the case for typical electret filter media. In one aspect, the inventive filter media comprises:

a) a hydrocharged fibrous filtration layer that contains a plurality of intertwined nanofibers that have a length of about 12 to about 300 millimeters (mm), and b) a porous roll-to-roll processable support layer.

The filtration layer in the disclosed media may, for example, be prepared according to U.S. Pat. Nos. 4,536,361 or 6,315,806 B1, and hydrocharged, for example, according to U.S. Pat. No. 5,496,507.

BRIEF DESCRIPTION OF THE DRAWING

Like reference symbols in the various figures of the drawing indicate like elements. The elements in the drawing are not to scale.

DETAILED DESCRIPTION

Figure 1A:
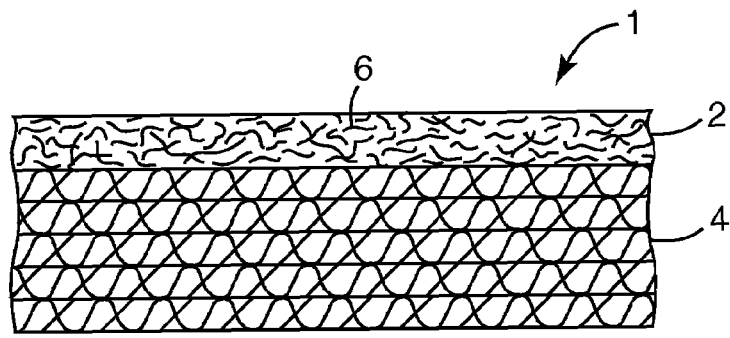
FIG. 1a and FIG. 1b are schematic cross-sectional views of multilayer filtration media in accordance with the present invention.

The terms used in this document are defined as follows:

"aerosol" means a gas that contains suspended particles in solid or liquid form;

"basis weight" when used with respect to a filter or filter layer means the weight of the material or materials in the filter or filter layer per unit surface area of the major surfaces of the filter or filter layer;

"charged" when used with respect to a collection of fibers means fibers that exhibit at least a 50% loss in Quality Factor QF (discussed below) after being exposed to a 20 Gray absorbed dose of 1 mm beryllium-filtered 80 KVp X-rays when evaluated for percent dioctyl phthalate (% DOP) penetration at a face velocity of 7 cm/sec;

"continuous" when used with respect to a fiber or collection of fibers means fibers having an essentially infinite aspect ratio (viz., a ratio of length to size of e.g., at least about 10,000 or more);

"effective fiber diameter" (EFD) when used with respect to a collection of fibers means the value determined according to the method set forth in Davies, C. N., "The Separation of Airborne Dust and Particles", Institution of Mechanical Engineers, London, Proceedings 1B, 1952 for a web of fibers of any cross-sectional shape be it circular or non-circular;

"efficiency" when used with respect to a filter means the amount, expressed in percent, of a challenge aerosol removed by the filter, as determined based on percent penetration where Efficiency (%)=100−penetration (%);

for example, a filter exhibiting a penetration of 5% would have a corresponding efficiency of 95%;

"hydrocharged" used with respect to a collection of fibers means that the fibers have been placed in intimate contact with a polar fluid (e.g., water, an alcohol, a ketone, or mixture of polar fluids) and then dried under conditions sufficient so that the fibers become charged.

"layer" means a portion of a filter that has two major surfaces and a thickness between the major surfaces; the layer may extend for an indefinite distance along the major surfaces or it may have defined boundaries;

"majority" means more than 50%;

"nanofibers" means fibers that have a median size (as determined using microscopy and manual counting) of less than 1 μm;

"nonwoven web" means that the web does not have its fibers arranged in a predetermined fashion such as one set of fibers going over and under fibers of another set in an ordered arrangement;

"polymer" means a macromolecule made from monomers and includes homopolymers, copolymers, and polymer blends;

"polymeric material" means material that includes at least one polymer and possibly other ingredients in addition to a polymer;

"porous" means air-permeable;

"pressure drop" means a reduction in static pressure within a fluid stream (e.g., an airstream) between the upstream and downstream sides of a filter through which the fluid stream passes;

"respirator" means a system or device that is designed to be worn over a person's breathing passages to prevent contaminants from entering the wearer's respiratory tract or to protect other persons or things from exposure to pathogens or other contaminants expelled by the wearer during respiration, including, but not limited to filtering face masks;

"roll-to-roll processable" when used with respect to a filter or support layer means that the filter or support layer can be manufactured and if desired converted to discrete filters using roll-to-roll web-handling equipment;

"size" when used with respect to a fiber means the fiber diameter for a fiber having a circular cross section, or the length of the longest cross-sectional chord that may be constructed across a fiber having a non-circular cross-section; and "substantially all" means at least 80%.

FIG. 1a illustrates a schematic cross-sectional view of one embodiment of the disclosed multilayer media. Media 1 includes fibrous filtration layer 2 adjacent to support layer 4. Layer 2 contains nanofibers 6, and may be prepared, for example, according to U.S. Pat. No. 4,536,361. The fibers 6 are intertwined and preferably represent the majority and more preferably substantially all of the fibers in layer 12. The fibers 6 have finite lengths of about 12 to about 300 mm, about 25 to about 200 mm, or about 50 to about 150 mm and are not continuous. Layer 2 is porous but has pore sizes that are sufficiently fine to capture small particles (e.g., micrometer-sized and smaller particles) entrained in fluids (e.g., air) that may pass through media 1. Layer 4 is also porous, but typically has much larger size pores than layer 2. In the illustrated embodiment, layer 4 is a knit open-weave fabric. Fluid may flow through media 1 in a variety of directions (e.g., normal to media 1 through layer 2 and then through layer 4, or normal to media 1 through layer 4 and then through layer 2). For air filtration the typical direction of flow would be through layer 4 and then through layer 2.

Figure 1B:
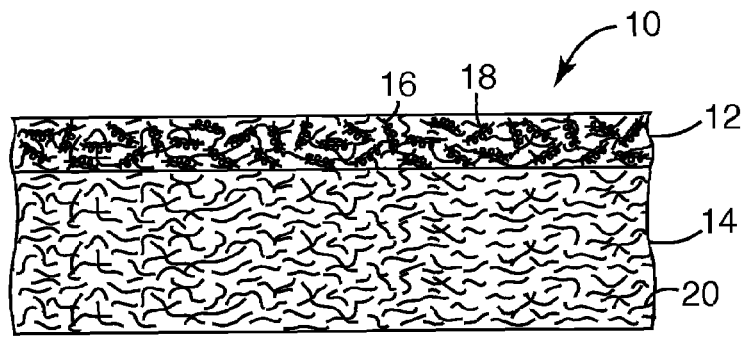

FIG. 1b illustrates a schematic cross-sectional view of another embodiment of the disclosed multilayer media. Media 10 includes fibrous filtration layer 12 adjacent to support layer 14. Layer 12 contains a plurality of first fibers 16 that have a median fiber size of one micrometer or more, and a plurality of second fibers 18 that have submicron size and that preferably represent a majority of the fibers in layer 12. Layer 12 may be prepared, for example, according to U.S. Pat. No. 6,315,806 B1. The fibers 16 preferably represent less than half the fibers in layer 12. The fibers 16 may for example represent from about 1 to about 49, or about 2 to about 40, or about 3 to about 20, or about 5 to about 15 percent of the total fiber count (or a representative sample thereof) in layer 12. The fibers 18 may for example represent from about 51 to about 99, or about 60 to about 98, or about 80 to about 97, or about 85 to about 95 percent of the total fiber count (or a representative sample thereof) in layer 12. The fibers 18 have finite lengths, for example about 12 to about 300 mm, about 25 to about 200 mm, or about 50 to about 150 mm, and may have an average length less than or greater than that of the fibers 16. The fibers 18 may be at least partially wound around some of the first fibers 16 and may be supported in layer 12 by the plurality of first fibers 16. Layer 12 is porous but has pore sizes that are sufficiently fine to capture small particles entrained in fluids that may pass through media 10. Layer 14 is also porous, but typically has much larger size pores than layer 12. In the illustrated embodiment, layer 14 includes fibers 20 arranged in a nonwoven web. Fluid may flow through media 10 in a variety of directions (e.g., normal to media 10 through layer 12 and then through layer 14, or normal to media 10 through layer 14 and then through layer 12). For air filtration the normal direction of flow would be through layer 14 and then through layer 12.

Figure 2A:
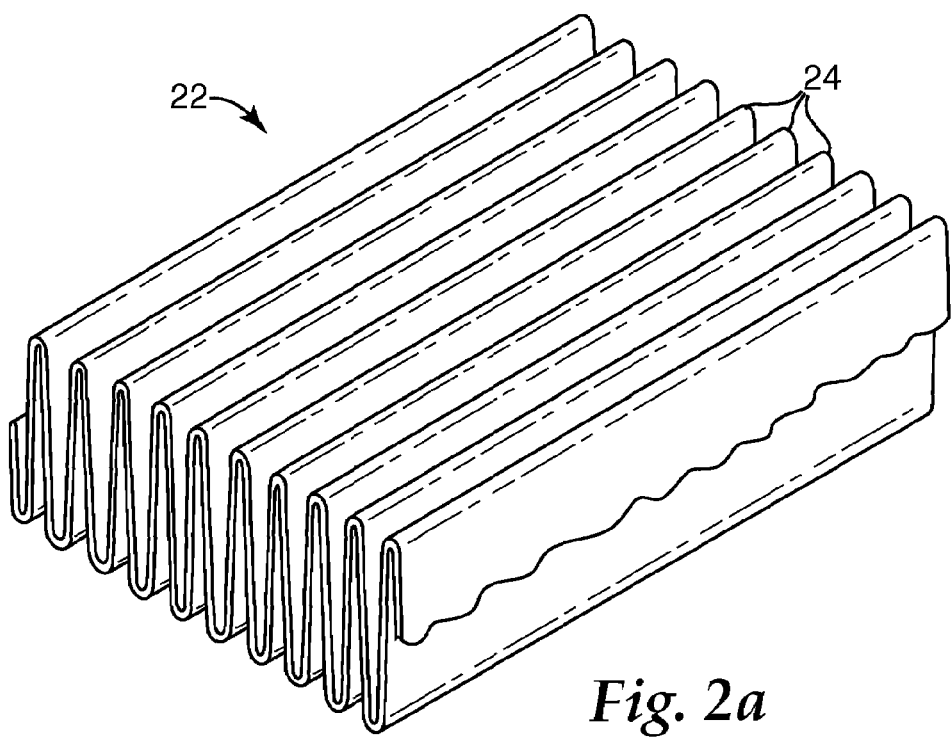
FIG. 2a is a perspective view of a pleated filter in accordance with the present invention.

FIG. 2a shows in perspective view a pleated filter 22 that has been made by forming the disclosed multilayer media (e.g., media 1 or 10) into rows of spaced pleats 24. Filter 22 may be used "as is" or may have selected portions of filter 22 further stabilized or reinforced (e.g., with a planar expanded metal face layer, reinforcing lines of hot-melt adhesive, adhesively-bonded reinforcing bars, or other selective reinforcing support) and optionally mounted in a suitable frame (e.g., a metal or cardboard frame) to provide a replaceable filter for use in e.g., HVAC systems. Aside from the multilayer media, further details regarding the construction of filter 22 will be familiar to those having ordinary skill in the art.

Figure 2B:
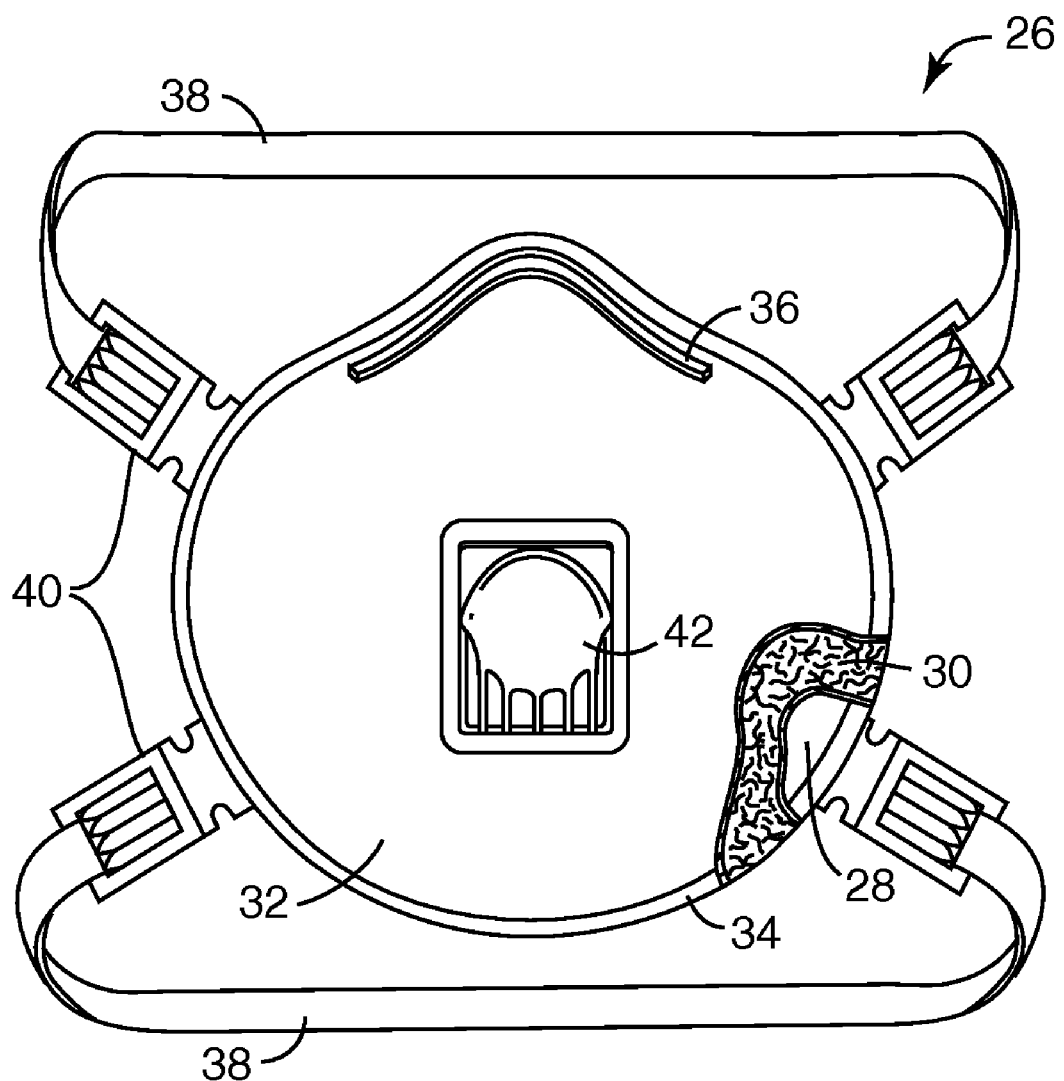
FIG. 2b is a perspective view, partially in section, of a disposable personal respirator in accordance with the present invention.

FIG. 2b shows in perspective view and partial cross-section a cup-shaped disposable personal respirator 26. Respirator 26 includes inner cover web 28, filtration layer 30 made from the disclosed multilayer media (e.g., media 1 or 10), and outer cover layer 32. Welded edge 34 holds these layers together and provides a face seal region to reduce leakage past the edge of respirator 26. Leakage may be further reduced by pliable dead-soft nose band 36 of for example a metal such as aluminum or a plastic such as polypropylene Respirator 26 also includes adjustable head and neck straps 38 fastened using tabs 40, and exhalation valve 42. Aside from the multilayer media, further details regarding the construction of respirator 26 will be familiar to those having ordinary skill in the art.

The disclosed filtration layer preferably is formed directly on the support layer rather than being formed in isolation. The filtration layer may contain one or more types of fibers, made from the same or different polymeric fiber-forming materials. A majority and preferably all of the fibers in the filtration layer are formed from fiber-forming materials capable of accepting satisfactory electret charge and maintaining adequate charge separation. Preferred polymeric fiber-forming materials are non-conductive resins having a volume resistivity of $10^{14}$ ohm-centimeters or greater at room temperature (22° C.). Preferably, the resin has a volume resistivity of about $10^{16}$ ohm-centimeters or greater. Resistivity of the polymeric fiber-forming material may be measured according to standardized test ASTM D 257-93. Some examples of polymers which may be used include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those having ordinary skill in the art. Some or all of the filtration layer fibers may if desired be made from multicomponent fibers, including splittable fibers. Suitable multicomponent (e.g., bicomponent) fibers include side-by-side, sheath-core, segmented pie, islands in the sea, tipped and segmented ribbon fibers. If splittable fibers are employed, splitting may be carried out or encouraged using a variety of techniques that will be familiar to those having ordinary skill in the art including carding, air jets, embossing, calendering, hydroentangling or needle punching. The filtration layer preferably is prepared from monocomponent fibers of poly-4-methyl-1 pentene or polypropylene, or from bicomponent fibers of poly-4-methyl-1 pentene and polypropylene in a layered or core-sheath configuration, e.g., with poly-4-methyl-1 pentene or polypropylene on the outer surface. Most preferably, the filtration layer is prepared from polypropylene homopolymer monocomponent fibers because of the ability of polypropylene to retain electric charge, particularly in moist environments. Additives may be added to the polymer to enhance filtration performance, electret charging capability, mechanical properties, aging properties, coloration, surface properties or other characteristics of interest. Representative additives include fillers, nucleating agents (e.g., MILLAD™ 3988 dibenzylidene sorbitol, commercially available from Milliken Chemical), electret charging enhancement additives (e.g., tristearyl melamine, and various light stabilizers such as CHIMASSORB™ 119 and CHIMASSORB 944 from Ciba Specialty Chemicals), cure initiators, stiffening agents (e.g., poly(4-methyl-1-pentene)), surface active agents and surface treatments (e.g., fluorine atom treatments to improve filtration performance in an oily mist environment as described in U.S. Pat. Nos. 6,398,847 B1, 6,397,458 B1, and 6,409,806 B1 to Jones et al.). The types and amounts of such additives will be familiar to those having ordinary skill in the art. For example, electret charging enhancement additives are generally present in an amount less than about 5 wt. % and more typically less than about 2 wt. %. The polymeric fiber-forming material also preferably is substantially free from components such as antistatic agents that could significantly increase electrical conductivity or otherwise interfere with the fiber's ability to accept and hold electrostatic charge.

The filtration layer may have a variety of basis weights, fiber sizes, thicknesses, pressure drops and other characteristics, and by itself may be sufficiently fragile so as not to be roll-to-roll processable. The filtration layer may, for example, have a basis weight in the range of about 0.5 to about 300 g/m$^2$ (gsm), about 0.5 to about 100 gsm, about 1 to about 50 gsm, or about 2 to about 40 gsm. Relatively low basis weights, e.g., of about 2, 5, 15, 25 or 40 gsm are preferred for the filtration layer. The fibers in the filtration layer may have, for example, a median fiber size less than about 10 µm, less than about 5 µm or less than about 1 µm. The filtration layer thickness may, for example, be about 0.1 to about 20 mm, about 0.2 to about 10 mm, or about 0.5 to about 5 mm. Nanofiber filtration layers applied at very low basis weights to some support layers (e.g., rough-textured support layers) may not change the overall media thickness. The filtration layer basis weight and thickness can be controlled or adjusted, for example, by changing the collector speed or polymer throughput.

The support layer is sufficiently robust so that the filtration layer may be formed on the support layer and the resulting media may be further converted as needed using roll-to-roll processing equipment. The support layer may be formed from a variety of materials, and may have a variety of basis weights, thicknesses, pressure drops and other characteristics. For example, the support layer may be a nonwoven web, woven fabric, knit fabric, open cell foam or perforated membrane. Nonwoven fibrous webs are preferred support layers. Suitable fibrous precursors for making such nonwoven webs include the polymeric fiber-forming materials discussed above and other polymeric fiber-forming materials that do not readily accept or hold and electrostatic charge. The support layer may also be formed from natural fibers or from blends of synthetic and natural fibers. If made from a nonwoven web, the support layer may, for example, be formed from molten thermoplastic polymer using meltblowing, meltspinning or other suitable web processing techniques, be formed from natural fibers or from blends of synthetic and natural fibers using carding or deposition from a Rando-Webber machine, or be formed using other techniques that will be familiar to those having ordinary skill in the art. If made from a woven web or knit fabric, the support layer may, for example, be formed from microdenier continuous filament or staple fiber yarns (viz., yarns having a denier per filament (dpf) less than about 1) and processed into a woven or knit support fabric using suitable processing techniques that will be familiar to those having ordinary skill in the art. The support layer may, for example, have a basis weight in the range of about 5 to about 300 gsm, more preferably about 40 to about 150 gsm. The thickness of the support layer may, for example, be about 0.2 to about 40 mm, about 0.2 to about 20 mm, about 0.5 to about 5 mm or about 0.5 to about 1.5 mm.

Additional layers may be added to the disclosed media if desired. Representative additional layers will be familiar to persons having ordinary skill in the art, and include protective layers (e.g., anti-shedding layers, anti-irritation layers, and other cover layers), reinforcing layers and sorbent layers. Sorbent particles (e.g., activated carbon particles or alumina particles) may also be introduced into the media (e.g., into support layer 14) using methods that will be familiar to persons having ordinary skill in the art.

Hydrocharging of the disclosed multilayer media may be carried out using a variety of techniques including impinging, soaking or condensing a polar fluid onto the media, followed by drying, so that the media becomes charged. Representative patents describing hydrocharging include the above-mentioned U.S. Pat. No. 5,496,507, and U.S. Pat. Nos. 5,908,598 (Rousseau et al.), 6,375,886 B1 (Angadjivand et al. '886), 6,406,657 B1 (Eitzman et al. '657), 6,454,986 B1 (Eitzman et al. '986) and 6,743,464 B1 (Insley et al.). Preferably water is employed as the polar hydrocharging liquid, and the media preferably is exposed to the polar hydrocharging liquid using jets of the liquid or a stream of liquid droplets provided by any suitable spray means. Devices useful for hydraulically entangling fibers are generally useful for carrying out hydrocharging, although the operation is carried out at lower pressures in hydrocharging than generally used in hydroentangling. U.S. Pat. No. 5,496,507 describes an exemplary apparatus in which jets of water or a stream of water droplets are impinged upon the media at a pressure sufficient to provide the subsequently-dried media with a filtration-enhancing electret charge. The pressure necessary to achieve optimum results may vary depending on the type of sprayer used, the type of polymer from which the filtration layer 12 is formed, the thickness and density of the media, and whether pretreatment such as corona charging was carried out before hydrocharging. Generally, pressures in the range of about 69 to about 3450 kPa are suitable. Preferably, the water used to provide the water droplets is relatively pure. Distilled or deionized water is preferable to tap water.

The disclosed media may be subjected to other charging techniques before or after hydrocharging including electrostatic charging (e.g., as described in U.S. Pat. Nos. 4,215,682, 5,401,446 and 6,119,691), tribocharging (e.g., as described in U.S. Pat. No. 4,798,850) or plasma fluorination (e.g., as described in U.S. Pat. No. 6,397,458 B1). Corona charging followed by hydrocharging and plasma fluorination followed by hydrocharging are preferred combination charging techniques.

The disclosed multilayer media may be evaluated to determine percent penetration, pressure drop and the filtration Quality Factor QF using a challenge aerosol containing NaCl or DOP particles, delivered (unless otherwise indicated) at flow rates of 60 liters/min for NaCl particles and 85 liters/min for DOP particles, and evaluated using a TSI™ Model 8130 high-speed automated filter tester (commercially available from TSI Inc.). For NaCl testing, the particles may generated from a 2% NaCl solution to provide an aerosol containing particles with a diameter of about 0.075 μm at an airborne concentration of about 16-23 mg/m$^3$, and the Automated Filter Tester may be operated with both the heater and particle neutralizer on. For DOP testing, the aerosol may contain particles with a diameter of about 0.185 μm at a concentration of about 100 mg/m$^3$, and the Automated Filter Tester may be operated with both the heater and particle neutralizer off. Calibrated photometers may be employed at the filter inlet and outlet to measure the particle concentration and the % particle penetration through the media. An MKS pressure transducer (commercially available from MKS Instruments) may be employed to measure pressure drop (ΔP, mm H$_2$O) through the media. The equation:

$$QF = \frac{-\ln\left(\frac{\% \text{ Particle Penetration}}{100}\right)}{\Delta P}$$

may be used to calculate QF. Parameters which may be measured or calculated for the chosen challenge aerosol include initial particle penetration, initial pressure drop, initial Quality Factor QF, maximum particle penetration, pressure drop at maximum penetration, and the milligrams of particle loading at maximum penetration (the total weight challenge to the filter up to the time of maximum penetration). Loading tests to determine maximum penetration are performed by continuously challenging the filter with aerosol while continuously measuring penetration and pressure drop; the test is typically stopped after a clear penetration maximum is observed. Owing to the relatively good correlation between initial penetration and maximum penetration for the disclosed media, the initial Quality Factor QF value provides a very reliable indicator of overall performance, with higher initial QF values indicating better filtration performance and lower initial QF values indicating reduced filtration performance. When exposed to 0.075 μm NaCl particles at a 5.5 cm/s flow rate, the media preferably has an initial Quality Factor QF of at least about 0.9 mm$^{-1}$ H$_2$O and more preferably at least about 1.8 mm$^{-1}$ H$_2$O. When exposed to 0.075 μm NaCl particles at a 10 cm/s flow rate, the media preferably has an initial Quality Factor QF of at least about 0.4 mm$^{-1}$ H$_2$O and more preferably at least about 0.8 mm$^{-1}$ H$_2$O. When exposed to 0.185 μm DOP particles at a 14 cm/s flow rate, the media preferably has a Quality Factor QF of at least about 0.2 mm$^{-1}$ H$_2$O and more preferably at least about 0.4 mm$^{-1}$ H$_2$O.

The disclosed multilayer media may be used in sheet form, or may be molded, folded or otherwise formed into shaped media having a three-dimensional configuration. For example, the disclosed media may be formed into pleated filters using methods and components such as those described in U.S. Pat. No. 6,740,137 B2 (Kubokawa et al.) and U.S. Patent Application Publication No. US2005/0217226 A1 (Sundet et al. '226). Pleat formation generally will be assisted by the use of heat to bond (or to further bond) the fibers to one another at least some of the points of fiber intersection. Pleat formation may be carried out or augmented using other methods and components that will be familiar to those having ordinary skill in the art. Selected portions of the filter element may also be stabilized or reinforced by adding tip stabilization (e.g., a planar wire face layer or lines of hot melt adhesive) or perimeter reinforcement (e.g., an edge adhesive or a filter frame). The disclosed media may also be formed into respirators using methods that will be familiar to those having ordinary skill in the art such as those described in U.S. Pat. Nos. 4,536,440 (Berg), 4,547,420 (Krueger et al.), 5,374,458 (Burgio), 6,394,090 B1 (Chen et al.), 6,827,764 B2 (Springett et al.) and 7,069,930 B2 (Bostock et al.)

EFD may be determined (unless otherwise specified) using an air flow rate of 85 liters/min (corresponding to a face velocity of 13.8 cm/sec), using the method set forth in Davies, C. N., "The Separation of Airborne Dust and Particles", Institution of Mechanical Engineers, London, Proceedings 1B, 1952.

The disclosed multilayer media may be used in heating, ventilation, and air conditioning filtration (HVAC) applications, where they would be particularly suited for efficiencies of MERV 12 and greater. The charged nanofibers may also be used in cleanroom filtration applications, which typically require HEPA (high-efficiency particulate air), ULPA (ultra-low penetration air), and higher efficiencies. The disclosed multilayer media may be used in personal respiratory protection devices, such as maintenance free respirators, dust masks, and cartridge filters for half-face, full-face, or powered air respirators. The multilayer media may also be used in automotive cabin air filtration, intake air filtration, vacuum bags and other vacuum filtering devices. The multilayer media may also be used in a room air purifier application.

The invention is further illustrated in the following illustrative examples, in which all parts and percentages are by weight unless otherwise indicated.

EXAMPLE 1

Using an apparatus like that shown in U.S. Pat. Nos. 6,607,624 B2 (Berrigan et al. '624) and 6,916,752 B2 (Berrigan et al. '752) and a quenched flow heater like that shown in U.S. patent application Ser. No. 11/457,899 filed Jul. 31, 2006, three polypropylene spun-bonded support layer webs were prepared from DYPRO™ 3860 polypropylene having a melt flow rate index of 100 available from Total Petrochemicals. The support web characteristics are shown below in Table 1:

TABLE 1

Support Layer Characteristics

| Run No. | Basis Weight, gsm | Thickness, mm | EFD, μm | Polymer spin rate, g/hole/min |
|---------|-------------------|---------------|---------|-------------------------------|
| 1-1     | 114               | 1.12          | 18      | 0.9                           |
| 1-2     | 85                | 0.94          | 12      | 0.2                           |
| 1-3     | 112               | 1.22          | 19      | 0.9                           |

The Run No. 1-1 support layer was corona-charged using a four-beam belt corona charging unit operated using an 3 m/min belt speed and a 29 kV corona voltage, then hydrocharged using a hydrocharging unit operated using a 1.5 m/min belt speed, 0.8 MPa water pressure, and deionized water. Both sides of the web were subjected to water spray and vacuum water removal. The Run No. 1-2 and 1-3 support layers were uncharged. The Run No. 1-1 and 1-2 support layer webs were coated with polypropylene nanofibers at basis weights of 5, 15, 25, and 50 gsm, and the Run No. 1-3 support layer web was coated with polypropylene nanofibers at basis weights of 5, 8, 10, and 13 gsm, using a single-emitter, 30.5 cm wide fiber-forming apparatus at Nanofibers, Inc. (Aberdeen, N.C.). The polypropylene applied to the Run No. 1-1 and 1-2 support layer webs was selected by Nanofibers, Inc. personnel and the polypropylene applied to the Run No. 1-3 support layer web was FINA™ 3960 polypropylene having a melt flow rate index of 350 available from Total Petrochemicals. The nanofiber layer was well-adhered to the spun-bonded support layer. This appeared to be due both to entanglement and to thermal bonding occurring as the nanofibers were deposited onto the spun-bonded support layer.

Gold/palladium-coated samples of the 5 gsm nanofiber layer on the Run No. 1-1 support and the 11 gsm nanofiber layer on the Run. No. 1-3 support were evaluated using scanning electron microscopy at magnifications from 100× to 3,000×, using a LEO VP 1450 scanning electron microscope from Carl Zeiss SMT operated under high vacuum using a 15 kV accelerating voltage, 15 mm working distance (WD) and 0° tilt. Fiber diameter measurements were taken from images taken at 1000× and higher magnifications using the UTHSCSA IMAGE TOOL image analysis program from the University of Texas Health Science Center at San Antonio. The nanofibers had the characteristics shown below in Table 2:

TABLE 2

Nanofiber Filtration Layer Characteristics

| Characteristic | 5 gsm Nanofibers on Run No. 1-1 Support | 11 gsm Nanofibers on Run No. 1-3 Support |
|----------------|------|------|
| Mean Size, μm   | 0.56 | 0.60 |
| Std Dev         | 0.42 | 0.28 |
| Min Size, μm    | 0.13 | 0.21 |
| Max Size, μm    | 3.08 | 1.50 |
| Median Size, μm | 0.44 | 0.55 |
| Mode Size, μm   | 0.31 | 0.41 |
| Fiber Count     | 79   | 89   |

Figure 3A:
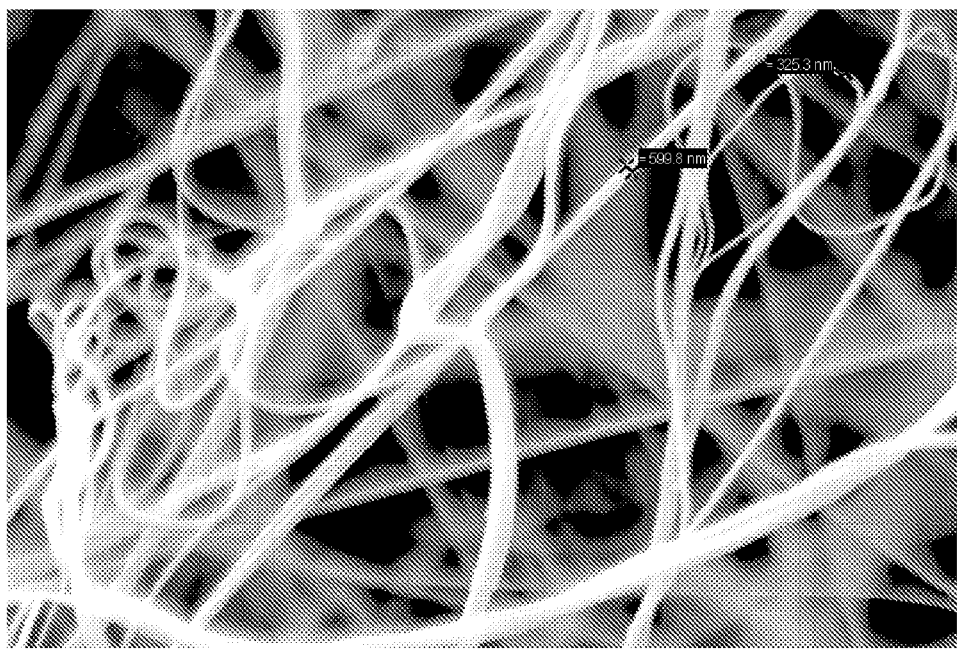
FIG. 3a and FIG. 3b are scanning electron microscope photos of filtration layers in the disclosed media in accordance with the present invention.
Figure 3B:
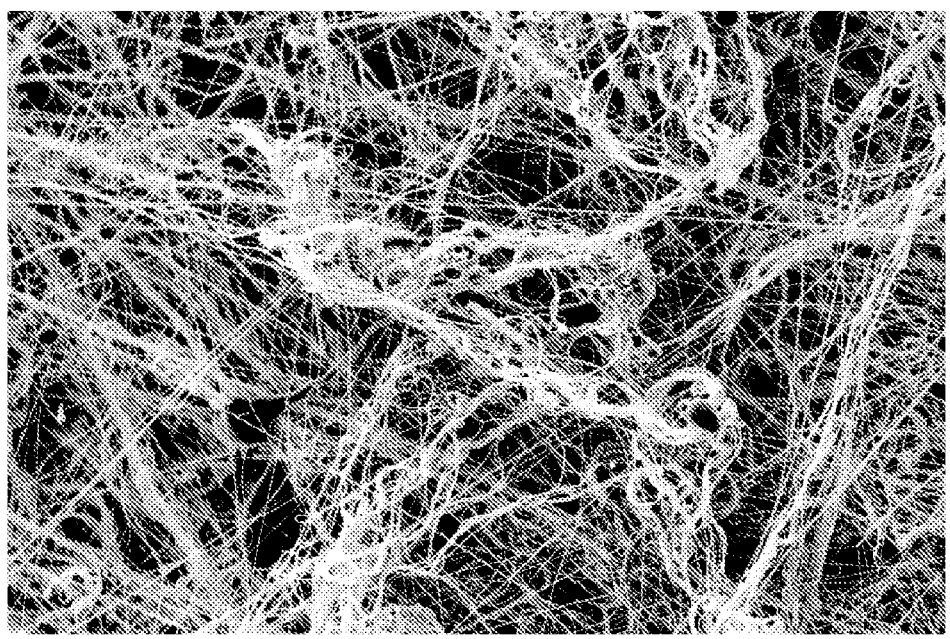

SEM photos of the 11 gsm filtration layer are shown in FIG. 3a (2000×) and FIG. 3b (250×). The photos show among other things that the nanofibers are intertwined and that they have submicron sizes.

Figure 4:
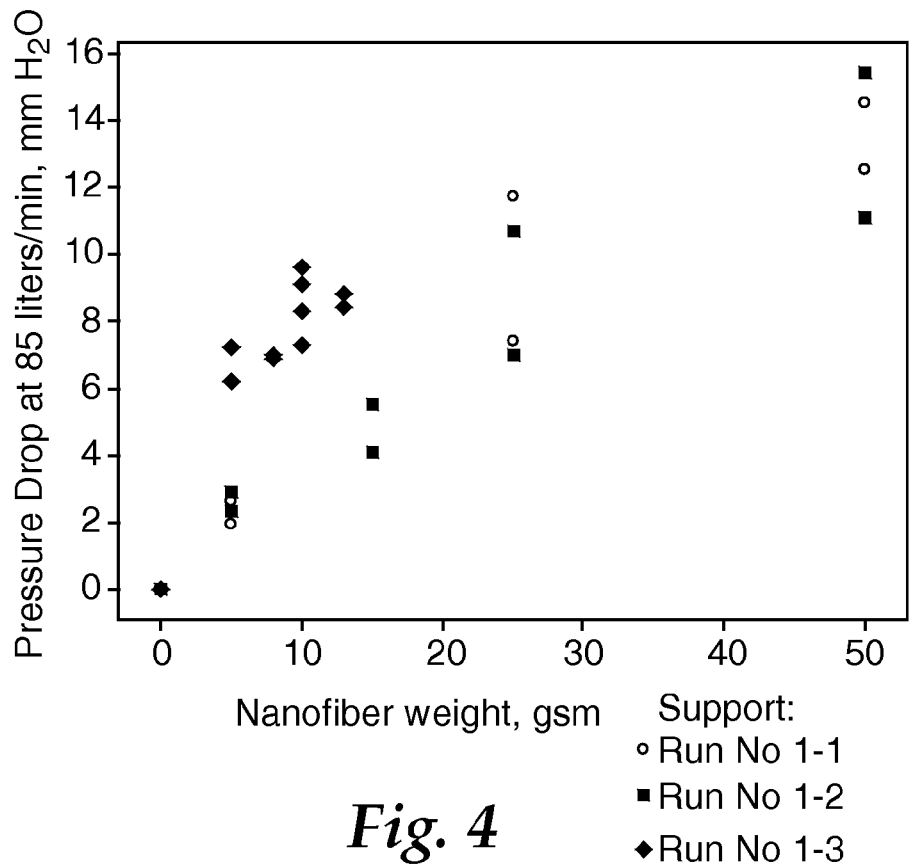
FIG. 4 is a plot showing pressure drop vs. filtration layer basis weight for filter media of the invention.

Samples of the multilayer media were corona-charged, or corona-charged and hydrocharged, using the procedures described above for the Run No. 1-1 support layer. Additional samples were plasma-fluorinated on a plasma-fluorination system using treatment conditions of 100 sccm perfluoropropane at 300 milliTorr and 1.0 kW exposure for 1 minute. The samples were flipped over and the plasma fluorination treatment was repeated. The samples were next hydrocharged using the procedures described above. The resulting charged multilayer media samples were next evaluated to determine pressure drop. FIG. 4 shows the results. For the multilayer media samples on the Run No. 1-1 support layer, it appeared that a pressure drop of about 2.5-3 mm $H_2O$ at an 85 liter/min flowrate would be provided by approximately 10 gsm of nanofibers. Lower basis weight nanofiber layers appeared to provide a higher marginal pressure drop for the first few grams, possibly indicating an interface effect with the substrate. The 25 and 50 gsm nanofiber samples appeared to have compacted during hydrocharging, resulting in an increase in pressure drop. The Run No. 1-1 filtration layer appeared to contain more shot and more roped/bundled fibers than the Run No. 1-3 filtration layer, and a less tight distribution of fiber diameters, and these factors may explain some of the observed pressure drop differences between the Run No. 1-1 and 1-3 results. The nanofibers coated on the Run No. 1-3 support layer appeared to provide substantially higher pressure drop on a per-weight basis than was observed for the other samples. Pressure drop may be controllable in part by seeking more uniform nanofiber laydown characteristics.

Figure 5:
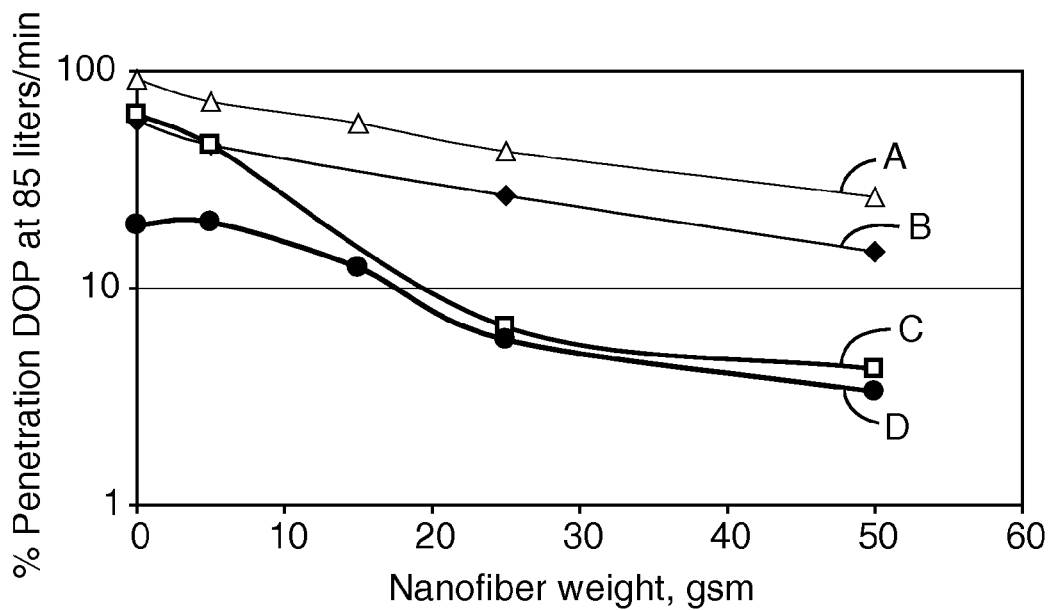
FIG. 5 is a plot showing penetration vs. filtration layer basis weight for filter media of the invention.

Multilayer media coated on the Run No. 1-1 (charged support layer) and Run No. 1-2 (uncharged support layer) were evaluated to determine the initial DOP penetration and Quality Factor QF values, and then compared to one another at various nanofiber basis weights. FIG. 5 shows the DOP results, with Curve A representing the samples on the Run No. 1-2 support layer before charging the nanofiber layer, Curve B representing the samples on the Run No. 1-1 support layer before charging the nanofiber layer, Curve C representing the samples on the Run No. 1-1 support layer after charging the nanofiber layer, and Curve D representing the samples on the Run No. 1-2 support layer after charging the nanofiber layer. These curves show among other things that multilayer media formed on the Run No. 1-2 support layer provided a higher quality factor and lower initial penetration when both layers of the multilayer media were hydrocharged. Curve A also demonstrates the mechanical filtration performance of the uncharged support layer and nanofiber layer. The left-hand origin of Curve B demonstrates the effect of using a hydrocharged support layer web at zero nanofiber weight. Comparison of Curves A and B shows that both the hydrocharged support layer web effect and the effect of the nanofibers remain constant for each applied weight of nanofibers. Curve C shows that when the originally charged support layer and nanofibers are charged, the support web is unaffected (the same penetration is observed at zero nanofiber weight), but the penetration when nanofibers are present is significantly lower, thus demonstrating that the nanofibers themselves have become charged. If the nanofibers had not become charged, Curve B and Curve C would have fallen on top of one another. Finally, Curve D shows that both the nanofibers and the support layer can be charged together and that the resulting performance may be attributed mainly to the nanofibers rather than to the support layer.

Figure 6:
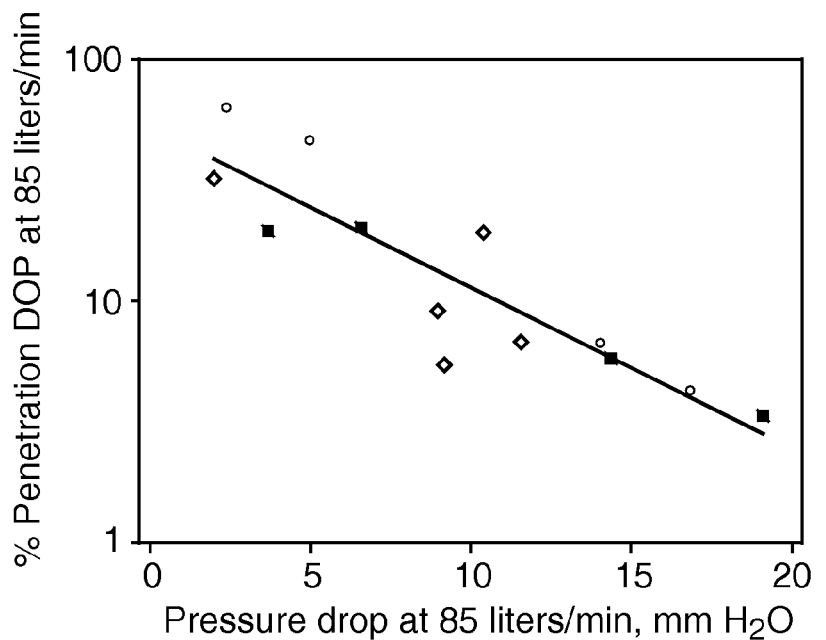
FIG. 6 is a plot correlating penetration vs. pressure drop at various filtration layer basis weights.

Samples that had been corona-charged and hydrocharged were evaluated by plotting pressure drop versus penetration at various nanofiber basis weights. The results are shown in FIG. 6. The pressure drop and penetration values were fairly well correlated, with an adjusted $R^2$ coefficient of 78% when pressure drop was compared to the natural log of the penetration value.

The uncharged and corona+hydrocharged samples formed on the Run No. 1-3 support layer were compared to show the initial DOP penetration and Quality Factor QF at various nanofiber basis weights. In addition, samples coated with 10 gsm nanofibers and only corona-charged or both plasma-fluorinated and hydrocharged were also examined to show the effect of the various charging treatments at a constant nanofiber coating weight. The results are shown below in Table 3a.

TABLE 3a

Initial DOP Penetration and Quality Factor QF

| Nanofiber weight, gsm | 0 | 5 | 8 | 10 | 13 |
|---|---|---|---|---|---|
| Mean Pressure Drop, mm $H_2O$ | 2.00 | 8.70 | 8.95 | 10.50 | 10.60 |
| % Penetration DOP, uncharged media | 86.0 | 51.1 | 43.9 | 25.7 | 25.9 |
| % Penetration DOP, corona-charged media | | | | 18.90 | |
| % Penetration DOP, corona + hydrocharged media | 32.10 | 5.47 | 9.13 | 6.77 | 19.10 |
| % Penetration DOP, plasma fluorinated + hydrocharged media | | | | 0.45 | |
| QF, uncharged media | 0.08 | 0.08 | 0.09 | 0.12 | 0.13 |
| QF, corona-charged media | | | | 0.18 | |
| QF, corona + hydrocharged media | 0.57 | 0.32 | 0.27 | 0.23 | 0.16 |
| QF, plasma fluorinated + hydrocharged media | | | | 0.53 | |

As shown in Table 3a, plasma fluorinated/hydrocharged media exhibited lower penetration and higher Quality Factor QF values than corona/hydrocharged media, corona-treated media or uncharged media. At a 10 gsm nanofiber weight, the plasma fluorinated/hydrocharged media had the highest Quality Factor QF at 0.53.

NaCl loading tests were also performed. Corona+hydrocharged samples formed on the Run No. 1-2 support layer were compared to show the initial pressure drop, initial NaCl penetration, initial Quality Factor QF, pressure drop at maximum penetration, maximum % penetration and mass challenge at maximum penetration at various nanofiber basis weights, using a 10 cm/sec face velocity. The results are shown below in Table 3b.

TABLE 3b

NaCl Penetration and Quality Factor QF on Run No. 1-2 Support Layer, Corona + Hydrocharged

| Nanofiber weight, gsm | 0 | 5 | 25 | 50 |
|---|---|---|---|---|
| Initial Pressure Drop, mm $H_2O$ | 2.3 | 5.6 | 11.1 | 14.6 |
| Initial % Penetration NaCl | 5.37 | 4.69 | 1.43 | 1.45 |
| Initial Quality Factor QF | 1.27 | 0.55 | 0.38 | 0.29 |
| Pressure Drop at Maximum Penetration, mm $H_2O$ | 5.1 | 11.3 | 11.1 | 14.6 |
| Maximum % Penetration NaCl | 34.6 | 6.88 | 1.43 | 1.45 |
| Mass Challenge at Maximum Penetration, Mg | 38.4 | 9.8 | 0 | 0 |

Uncharged, corona-charged, corona+hydrocharged and plasma-fluorinated+hydrocharged samples formed on the Run No. 1-2 and 1-3 support layers were compared to show the initial pressure drop, initial NaCl penetration, initial Quality Factor QF, pressure drop at maximum penetration, maximum % penetration and mass challenge at maximum penetration at various nanofiber basis weights. The results are shown below in Table 3c.

TABLE 3c

NaCl Penetration and Quality Factor QF on Run No. 1-3 Support Layer

| Nanofiber weight, gsm | 0 | 5 | 8 | 10 | 13 | 15 |
|---|---|---|---|---|---|---|
| Initial Pressure Drop, mm $H_2O$, uncharged | 1.4 | 6.8 | 6.2 | 8.1 | 7.8 | 5.7 |
| Initial Pressure Drop, mm $H_2O$, corona-charged | | | | 7.6 | | |
| Initial Pressure Drop, mm $H_2O$, corona + hydrocharged | 1.4 | 7.3 | 6.2 | 7.3 | 9.5 | |
| Initial Pressure Drop, mm $H_2O$, plasma-fluorinated + hydrocharged | | | | 7.5 | | |
| Initial % Penetration NaCl, uncharged | 92.4 | 42 | 41.4 | 12.6 | 9.63 | |
| Initial % Penetration NaCl, corona-charged | | | | 6.46 | | |
| Initial % Penetration NaCl, | 15.3 | 1.2 | 2.59 | 1.41 | 9.41 | |

TABLE 3c-continued

NaCl Penetration and Quality Factor QF on Run No. 1-3 Support Layer

| Nanofiber weight, gsm | 0 | 5 | 8 | 10 | 13 | 15 |
|---|---|---|---|---|---|---|
| Initial % Penetration NaCl, corona + hydrocharged | | | | | | |
| Initial % Penetration NaCl, plasma-fluorinated + hydrocharged | | | | 0.074 | | |
| Initial Quality Factor QF, uncharged | 0.06 | 0.13 | 0.14 | 0.26 | 0.30 | 0.12 |
| Initial Quality Factor QF, corona-charged | | | | 0.36 | | |
| Initial Quality Factor QF, corona + hydrocharged | 1.34 | 0.61 | 0.64 | 0.58 | 0.25 | |
| Initial Quality Factor QF, plasma-fluorinated + hydrocharged | | | | 0.96 | | |
| Pressure Drop at Maximum Penetration, mm H₂O, uncharged | 1.5 | 6.8 | 6.2 | 8.4 | 9.6 | 5.7 |
| Pressure Drop at Maximum Penetration, mm H₂O, corona-charged | | | | 7.6 | | |
| Pressure Drop at Maximum Penetration, mm H₂O, corona + hydrocharged | 2.8 | 9.9 | 10.6 | 8.6 | 9.5 | |
| Pressure Drop at Maximum Penetration, mm H₂O, plasma-fluorinated + hydrocharged | | | | 13 | | |
| Maximum % Penetration NaCl, uncharged | 94.4 | 42 | 41.4 | 12.8 | 12.3 | 51.6 |
| Maximum % Penetration NaCl, corona-charged | | | | 6.46 | | |
| Maximum % Penetration NaCl, corona + hydrocharged | 59.9 | 1.52 | 4.56 | 1.72 | 9.41 | |
| Maximum % Penetration NaCl, plasma-fluorinated + hydrocharged | | | | 0.35 | | |
| Mass Challenge at Maximum Penetration, mg NaCl, uncharged | 5.8 | 0 | 0 | 1.4 | 8.7 | 0 |
| Mass Challenge at Maximum Penetration, mg NaCl, corona-charged | | | | 0 | | |
| Mass Challenge at Maximum Penetration, mg NaCl, corona + hydrocharged | 43.1 | 8.5 | 14.2 | 4.3 | 0 | |
| Mass Challenge at Maximum Penetration, mg NaCl, plasma-fluorinated + hydrocharged | | | | 16.8 | | |

Figure 7:
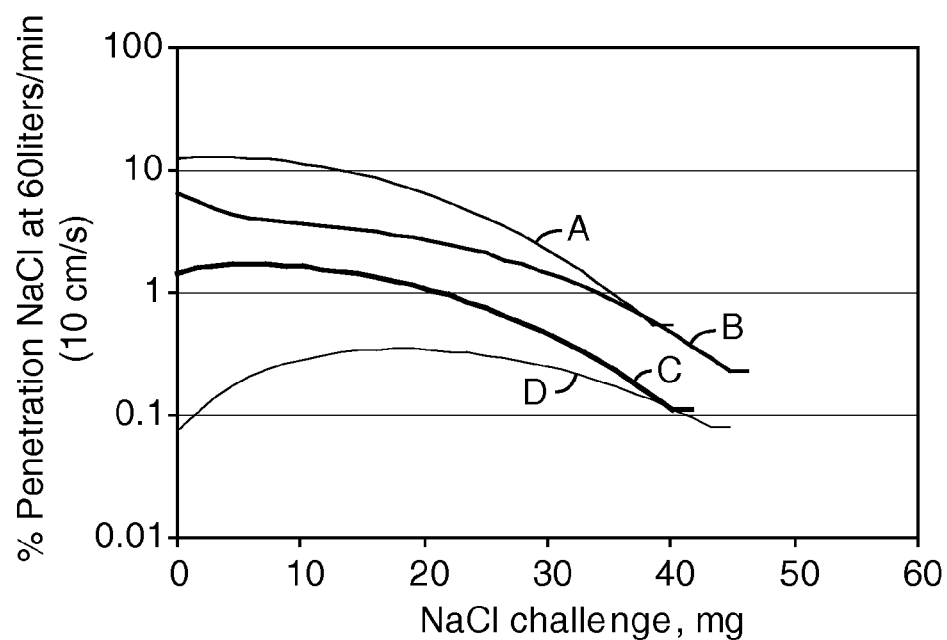
FIG. 7 is a plot showing sodium chloride penetration vs. challenge for filter media of the invention.
Figure 8:
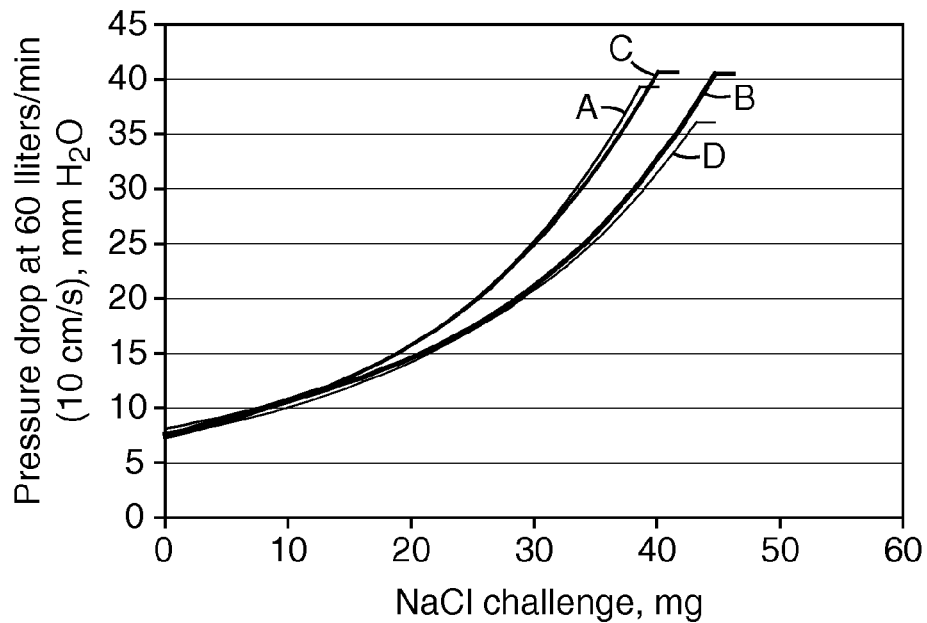
FIG. 8 is a plot showing pressure drop vs. sodium chloride challenge for filter media of the invention.

FIG. 7 shows penetration vs. loading curves for multilayer media containing a 10 gsm nanofiber filtration layer, and FIG. 8 shows corresponding pressure drop vs. loading curves. In FIG. 7 and FIG. 8, Curve A shows the results for uncharged media, Curve B shows the results for corona-charged media, Curve C shows the results for corona+hydrocharged media and Curve D shows the results for plasma fluorinated+hydrocharged media. The results show among other things that samples with low initial penetration values also had low maximum penetration by 0.075 μm NaCl particles—often initial and maximum penetration results are poorly correlated for other media. Also, the four charging techniques provided media with similar pressure drop loading curves.

Figure 9:
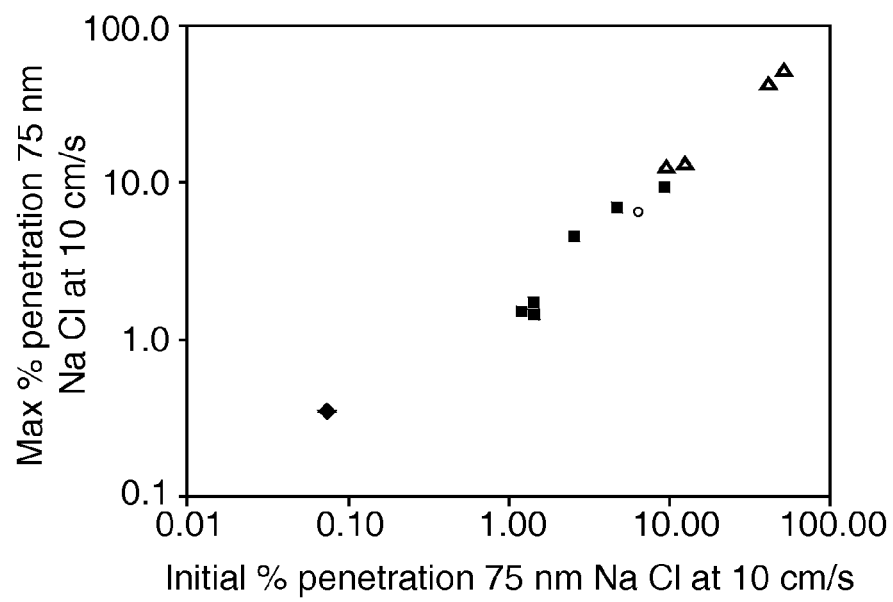
FIG. 9 and FIG. 10 are plots maximum vs. initial sodium chloride penetration.
Figure 10:
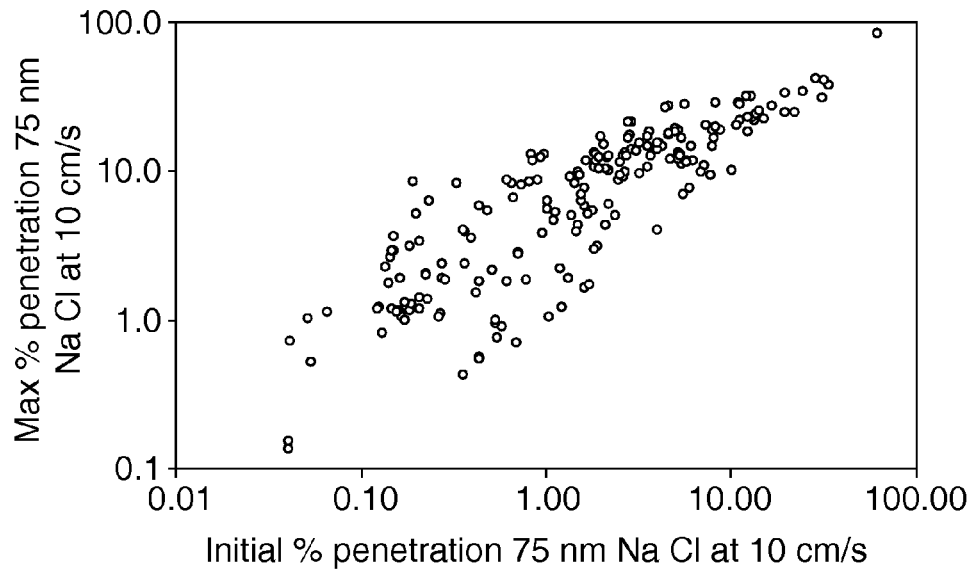

Further investigation of loading behavior was carried out by comparing various uncharged and charged multilayer media samples employing a nanofiber filtration layer to a various charged spunbond electret web samples. All samples were made from DYPRO 3860 polypropylene, and all samples were hydrocharged. The samples ranged in basis weight from 100 to 230 gsm and ranged in EFD from 8 to approximately 15 micrometers. Some samples were made with electret charging additives (0.25 to 2% tri-stearyl melamine or CHIMASSORB 944) and some samples were made without such additives. Some samples were calendared to modify the surface web properties, and others were not calendared. Both smooth and patterned calendar patterns were used. Some samples were also corona-charged prior to hydrocharging while others were not. FIG. 9 shows a comparison under equal testing conditions between the initial and maximum NaCl penetration values for uncharged and charged multilayer media samples coated on the Run No. 1-2 and 1-3 support layer webs. FIG. 10 shows a comparison under equal testing conditions between the initial and maximum NaCl penetration values for the spunbond electret. FIG. 9 shows that the nanofiber-containing samples, which included two different carrier webs and several different charging techniques, fell in a straight line. The maximum NaCl penetration for the nanofiber-containing samples could accordingly be predicted based on initial penetration results. FIG. 10 shows that the spunbond electret samples exhibited an order of magnitude or more of scatter, and that the maximum NaCl penetration values could not reliably be predicted based on the initial penetration results.

An additional test was performed to compare DOP loading and pressure drop for multilayer media containing 10 gsm of plasma fluorinated+hydrocharged nanofibers and for an uncharged fiberglass sample having the same initial pressure drop. DOP is sometimes considered a more degrading challenge than NaCl. The fiberglass media sample was identified as providing a 90-95% dust spot rating (MERV 14), with the properties shown below in Table 4.

TABLE 4

Fiberglass Media Properties

| Description | Density, g/cc | Basis Weight, gsm | Thickness, mm | Pressure Drop, mm H₂O | Solidity, % | EFD, μm |
|---|---|---|---|---|---|---|
| Fiberglass 90-95% dust spot (MERV 14) | 2.5 | 69 | 0.5 | 11.8 | 5.5 | 3.1 |

Figure 11:
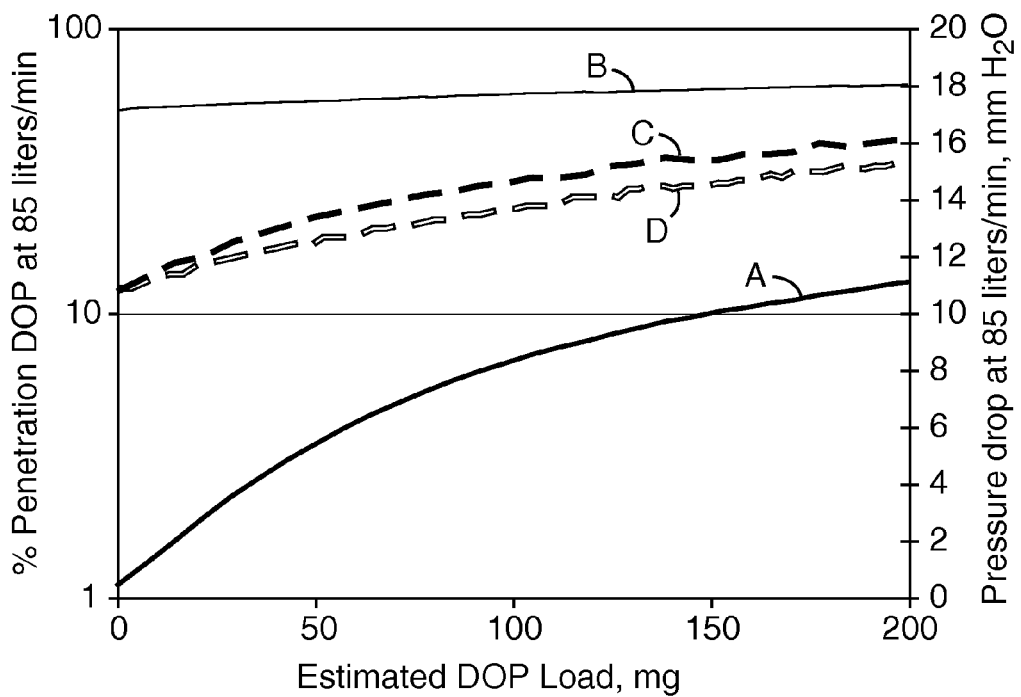
FIG. 11 is a plot showing dioctyl phthalate penetration and pressure drop vs. estimated challenge.

The loading test was performed using flat circular web samples at an 85 liter/minute flowrate until at least 200 mg of estimated DOP load had been captured. The nanofiber test was briefly stopped and restarted, resulting in a splice of the collected data. Both samples exhibited an approximately 11.8 mm H₂O initial pressure drop. Curve A and Curve B in FIG. 11 respectively show the DOP loading curves for the nanofiber-containing and fiberglass media samples. Curve C and Curve D respectively show the pressure drop curves for the nanofiber-containing and fiberglass media samples. As shown in FIG. 11, the nanofiber-containing media started at about 1% penetration, and gradually rose to 13% penetration at the 200 mg estimated load level. Although not shown in FIG. 11, the nanofiber-containing sample reached about 25% penetration at a 400 mg loading level and appeared to be still rising albeit slowly beyond 400 mg. The fiberglass sample started at 52% penetration and rose to 64% penetration after 200 mg of estimated load. It appeared to be still rising albeit slowly beyond 200 mg. Both samples exhibited similar increases in pressure drop for equivalent DOP loads.

A further test was undertaken to compare multilayer media containing 10 gsm of plasma fluorinated+hydrocharged nanofibers on the Run No. 1-3 support web to the preferred embodiment (the "Patent Embodiment") shown in U.S. Pat. No. 6,183,670 B1 (Torobin et al. '670). The Patent Embodiment is said in Torobin et al. '670 to have been electrostatically charged according to U.S. Pat. No. 5,401,446, and to exhibit filtration performance shown in FIG. 9 of Torobin et al. '670. The nanofiber-containing media was evaluated using a TSI 8130 Automated Filter Tester and 0.075 µm diameter NaCl particles flowing at a face velocity of 5.5 cm/sec as in Torobin et al. '670. Because a sample of the Patent Embodiment was not on hand, its filtration performance was calculated based on values taken from FIG. 9 in Torobin et al. '670. The resulting comparative results are shown below in Table 5:

TABLE 5

Comparison of Nanofiber-Containing Media and the Preferred Embodiment of U.S. Pat. No. 6,183,670 B1

| Media | Pressure Drop, mm $H_2O$ | % Penetration, NaCl | Quality Factor QF |
|---|---|---|---|
| Uncharged media containing a layer of 10 gsm nanofibers | 3.8 | 13.6 | 0.53 |
| Patent Embodiment from Torobin et al. '670 | 4.8[1] | 2.3[1] | 0.79[2] |
| Plasma fluorinated and hydrocharged media containing a layer of 10 gsm nanofibers | 4.0 | 0.026 | 2.07 |

[1] Estimated from graph
[2] Calculated based on estimated values

The nanofiber-containing media provided approximately two orders of magnitude lower penetration than the Patent Embodiment. The Patent Embodiment provided an approximately 50% greater Quality Factor QF than an uncharged sample, whereas the nanofiber-containing media provided an approximately 300% greater Quality Factor QF than an uncharged sample.

Three samples of the disclosed multilayer media coated with a nanofiber filtration layer at 5, 25 and 50 gsm were corona-charged and hydrocharged, stored for sixteen days and then tested to determine initial NaCl penetration and Quality Factor QF. The results are shown below in Table 6:

TABLE 6

Charge Stability

| Nanofiber Basis Weight, gsm | Initial Pressure Drop, mm $H_2O$ | % Penetration, NaCl | Quality Factor QF |
|---|---|---|---|
| 5 | 5.6 | 4.69 | 0.55 |
| 25 | 11.1 | 1.43 | 0.38 |
| 50 | 14.6 | 1.45 | 0.29 |

The samples retained significant electrostatic charge. Nanofibers may also be produced using electrospinning. However, as reported in Tsai et al., *Electrospinning Theory and Techniques*, 14th Annual International TANDEC Nonwovens Conference, Nov. 9-11, 2004, electrospun fibers lose their charge within a few days.

EXAMPLE 2

Using the method of Example 1, a spun-bonded web with a basis weight of 35 gsm, thickness of 0.018 inches, and an EFD of 20 µms was prepared from DYPRO 3860 polypropylene. The resulting support layer web was coated with polypropylene nanofibers at basis weights of 4.6, 7.0 and 27.44 gsm, using a 76.2 cm wide fiber-forming apparatus at Nanofibers, Inc. The nanofibers had an average fiber diameter of about 0.65 µm. Additional characteristics of the resulting multilayer media samples are shown below in Table 7. The pressure drop values were obtained using a 32 liter/minute flow rate:

TABLE 7

| Run No. | Nanofiber Basis Weight, gsm | Total Media Basis Weight, gsm | Total Media Thickness, mm | Pressure Drop, mm $H_2O$ |
|---|---|---|---|---|
| 2-1 | 0 | 35 | 0.46 | 0.15 |
| 2-2 | 4.6 | 39.60 | 0.43 | 0.58 |
| 2-3 | 7.0 | 42.03 | 0.47 | 0.67 |
| 2-4 | 27.4 | 62.44 | 1.09 | 3.37 |

These samples could be hydrocharged to provide charged multilayer filtration media containing a nanofiber filtration layer. The nanofibers of Run No. 2-2 were examined using SEM to determine the distribution of fiber sizes. The results are shown below in Table 8 and Table 9:

TABLE 8

Number Distribution of Fiber Diameters for Run No. 2-2

| Fiber Diameter (µm) | Number Count in Range |
|---|---|
| <0.2 | 1 |
| 0.2-0.4 | 24 |
| 0.4-0.6 | 62 |
| 0.6-0.8 | 19 |
| 0.8-1.0 | 10 |
| 1-1.2 | 7 |
| >1.2 | 9 |

TABLE 9

Nanofiber Filtration Layer Characteristics for Run No. 2-2

| Mean Size, µm | 0.65 |
|---|---|
| Standard Deviation | 0.43 |
| Min Size, µm | 0.18 |
| Max Size, µm | 4.04 |
| Median Size, µm | 0.54 |
| Mode Size, µm | 0.49 |

EXAMPLE 3

A propylene melt-blown support layer web having a 55 gsm basis weight, 1 mm thickness, and an EFD of 8.4 µm was prepared on a 50.8 cm wide meltblowing line. Using the method of Example 2, the support web was coated with nanofibers made from DYPRO 3860 polypropylene at basis weights of 1.8, 3.0 and 7.2 gsm. The nanofibers had an average fiber diameter of about 0.77 µm. Additional characteristics of the resulting multilayer media samples are shown below in Table 10. The pressure drop values were obtained using a 32 liter/minute flow rate:

TABLE 10

| Run No. | Nanofiber Basis Weight, gsm | Total Media Basis Weight, gsm | Total Media Thickness, mm | Pressure Drop, mm H₂O |
|---|---|---|---|---|
| 3-1 | 0 | 55 | 1.02 | 1.42 |
| 3-2 | 1.8 | 56.78 | 0.98 | 1.86 |
| 3-3 | 3.0 | 58.00 | 1.05 | 1.9 |
| 3-4 | 7.2 | 62.22 | 1.09 | 2.05 |

These samples could be hydrocharged to provide charged multilayer filtration media containing a nanofiber filtration layer.

EXAMPLE 4

An air-laid nonwoven support web was prepared on a 30.5 cm wide Rando-Webber machine. The feed fiber composition was 80% T293 32 denier by 76 mm polyethylene terephthalate fibers (available from Invista) and 20% CELBOND™ T254 12 denier by 38 mm bicomponent coPET/PET sheath/core fibers with a sheath melting point of about 110° C. (available from Invista). The air-laid web had an average basis weight of 42 gsm. Using the method of Example 2, the support web was coated with nanofibers at basis weights of 30, 41 and 126 gsm. The nanofibers had an average fiber diameter of about 0.60 µm. Additional characteristics of the resulting multilayer media samples are shown below in Table 11. The pressure drop values were obtained using a 32 liter/minute flow rate:

TABLE 11

| Run No. | Nanofiber Basis Weight, gsm | Total Media Basis Weight, gsm | Total Media Thickness, mm | Pressure Drop, mm H₂O |
|---|---|---|---|---|
| 4-1 | 30 | 71.60 | 5.18 | 0.25 |
| 4-2 | 41 | 82.56 | 3.94 | 4 |
| 4-3 | 126 | 167.91 | 6.71 | 9.35 |

These samples could be hydrocharged to provide charged multilayer filtration media containing a nanofiber filtration layer.

A number of embodiments of the invention have been described. Nevertheless, it will be understood that various modifications may be made without departing from the invention. Accordingly, other embodiments are within the scope of the following claims.

We claim:

1. Charged multilayer media that comprises:
   a) a hydrocharged fibrous filtration layer that contains a plurality of intertwined nanofibers that have a length of about 12 to about 300 mm, and
   b) a porous roll-to-roll processable support layer.

2. Charged multilayer media according to claim 1 wherein the fibers in the filtration layer have a median fiber size less than about 10 µm.

3. Charged multilayer media according to claim 1 wherein the fibers in the filtration layer have a median fiber size less than about 5 µm.

4. Charged multilayer media according to claim 1 wherein the fibers in the filtration layer have a median fiber size less than about 1 µm.

5. Charged multilayer media according to claim 1 wherein the nanofibers have a length of about 25 to about 200 mm.

6. Charged multilayer media according to claim 1 wherein the nanofibers have a length of about 50 to about 150 mm.

7. Charged multilayer media according to claim 1 wherein a majority of the fibers in the filtration layer are nanofibers.

8. Charged multilayer media according to claim 1 wherein about 60 to about 98 percent of the fibers in the filtration layer are nanofibers.

9. Charged multilayer media according to claim 1 wherein about 80 to about 97 percent of the fibers in the filtration layer are nanofibers.

10. Charged multilayer media according to claim 1 wherein the nanofibers comprise an olefin.

11. Charged multilayer media according to claim 1 wherein the nanofibers comprise polypropylene.

12. Charged multilayer media according to claim 1 wherein the filtration layer has a basis weight of about 0.5 to about 300 g/m².

13. Charged multilayer media according to claim 1 wherein the filtration layer has a basis weight of about 2 to about 40 g/m².

14. Charged multilayer media according to claim 1 wherein the filtration layer has a thickness of about 0.1 to about 20 mm.

15. Charged multilayer media according to claim 1 wherein the support layer comprises a woven fabric, knit fabric, open cell foam or perforated membrane.

16. Charged multilayer media according to claim 1 wherein the support layer comprises a nonwoven web.

17. Charged multilayer media according to claim 1 further comprising an anti-shedding layer, anti-irritation layer, reinforcing layer or sorbent layer.

18. Charged multilayer media according to claim 1 wherein the filtration layer is electrostatically charged and hydrocharged.

19. Charged multilayer media according to claim 1 wherein the filtration layer is plasma fluorinated and hydrocharged.

20. Charged multilayer media according to claim 1 which when evaluated using a 0.075 µm sodium chloride aerosol flowing at a 5.5 cm/sec face velocity has an initial filtration quality factor QF of at least about 0.9 mm$^{-1}$ H₂O.

21. Charged multilayer media according to claim 1 which when evaluated using a 0.075 µm sodium chloride aerosol flowing at a 5.5 cm/sec face velocity has an initial filtration quality factor QF of at least about 1.8 mm$^{-1}$ H₂O.

22. Charged multilayer media according to claim 1 which exhibits less than 5% maximum penetration when exposed to a 0.075 µm sodium chloride aerosol flowing at 10 cm/sec.

23. Charged multilayer media according to claim 1 which exhibits less than 1% maximum penetration when exposed to a 0.075 µm sodium chloride aerosol flowing at 10 cm/sec.

24. A pleated filter comprising charged multilayer media according to claim 1.

25. A respirator comprising charged multilayer media according to claim 1.

* * * * *